（12）United States Patent
Shinagawa et al.

(10) Patent No.: US 12,475,990 B2
(45) Date of Patent: Nov. 18, 2025

(54) METHOD AND APPARATUS FOR ANNOTATING A PORTION OF MEDICAL IMAGING DATA WITH ONE OR MORE WORDS

(71) Applicant: Siemens Healthineers AG, Forchheim (DE)

(72) Inventors: Yoshihisa Shinagawa, Downingtown, PA (US); Halid Yerebakan, Carmel, IN (US); Gerardo Hermosillo Valadez, West Chester, PA (US); Simon Allen-Raffl, West Chester, PA (US); Mahesh Ranganath, Malvern, PA (US); Michael Rusitska, Forchheim (DE)

(73) Assignee: Siemens Healthineers AG, Forchheim (DE)

( * ) Notice: Subject to any disclaimer, the term of this patent is extended or adjusted under 35 U.S.C. 154(b) by 492 days.

(21) Appl. No.: 17/806,949

(22) Filed: Jun. 15, 2022

(65) Prior Publication Data
US 2023/0033783 A1    Feb. 2, 2023

(30) Foreign Application Priority Data
Jul. 27, 2021    (EP) .................................... 21188069

(51) Int. Cl.
*G16H 30/20*    (2018.01)
*G06N 3/045*    (2023.01)
(Continued)

(52) U.S. Cl.
CPC ............. *G16H 30/40* (2018.01); *G06N 3/045* (2023.01); *G06N 5/02* (2013.01); *G06T 1/0028* (2013.01)

(58) Field of Classification Search
CPC ........ G16H 30/40; G16H 30/20; G06N 3/045; G06N 5/02; G06T 1/0028
See application file for complete search history.

(56) References Cited

U.S. PATENT DOCUMENTS

2009/0087053 A1    4/2009  de Vaan
2012/0281900 A1*   11/2012 Rueckert ............ G06V 10/7715
                                                                382/128
(Continued)

FOREIGN PATENT DOCUMENTS

JP          5398791 B2     1/2014

OTHER PUBLICATIONS

Rossi, Alberto, et al. "Multi-modal siamese network for diagnostically similar lesion retrieval in prostate MRI." IEEE Transactions on Medical Imaging 40.3 (2020): 986-995. (Year: 2020).*

(Continued)

*Primary Examiner* — Andrew M Moyer
*Assistant Examiner* — Dylan John Mendez Muniz

(57) ABSTRACT

There is disclosed a method and apparatus for annotating a first portion of medical imaging data with one or more words corresponding to a respective one or more features represented in the first portion of medical imaging data. A similarity metric indicating a degree of similarity between the first portion and each of a plurality of second portions of reference medical imaging data is determined, at least one of the plurality of second portions being annotated with one or more first words corresponding to a respective one or more features represented in the second portion. A second portion is selected based on the similarity metrics, and the first portion is annotated with the one or more first words with which the second portion, selected for the first portion, is annotated.

20 Claims, 5 Drawing Sheets

(51) Int. Cl.
*G06N 5/02* (2023.01)
*G06T 1/00* (2006.01)
*G16H 30/40* (2018.01)

(56) References Cited

U.S. PATENT DOCUMENTS

| | | | |
|---|---|---|---|
| 2016/0232668 A1* | 8/2016 | Ishiraha | A61B 6/032 |
| 2017/0039322 A1 | 2/2017 | Reicher et al. | |
| 2018/0357468 A1* | 12/2018 | Humphry | G06V 20/698 |
| 2019/0333217 A1* | 10/2019 | Bronkalla | G16H 50/70 |
| 2020/0058390 A1* | 2/2020 | Kohle | G16H 30/40 |
| 2020/0168321 A1 | 5/2020 | Kohle et al. | |
| 2020/0411201 A1* | 12/2020 | Kearney | G06N 3/047 |
| 2021/0279879 A1* | 9/2021 | Kanada | G16H 30/40 |
| 2024/0203101 A1* | 6/2024 | Zhang | G06V 20/70 |

OTHER PUBLICATIONS

Extended European Search Report in EP application No. 21188069.5, dated Jan. 12, 2022, 11 pages.

* cited by examiner

METHOD AND APPARATUS FOR ANNOTATING A PORTION OF MEDICAL IMAGING DATA WITH ONE OR MORE WORDS

CROSS-REFERENCE TO RELATED APPLICATION

This application claims the benefit of priority from European Patent Application No. 21188069.5, filed on Jul. 27, 2021, the contents of which are incorporated by reference.

TECHNICAL FIELD

The present framework relates to a method and apparatus for annotating a portion of medical imaging data with one or more words, and more specifically annotating a portion of medical imaging data with one or more words corresponding to a respective one or more features represented in the portion of medical imaging data.

BACKGROUND

Medical imaging, such as Magnetic Resonance Imaging (MRI), Computed Tomography (CT) and the like, is an invaluable tool for medical diagnosis. Typically, a medical professional, such as a radiologist, analyses or 'reads' an image produced from medical imaging performed on a patient, and records the findings in a medical text report, such as a radiology report. The medical text report may include a suspected diagnosis and/or a diagnosis may be made based on the findings included in the medical text report.

Medical imaging data produced from medical imaging can be volumetric, meaning imaging data is recorded over a three-dimensional region or volume of the patient. In these cases, the volumetric medical imaging data can be visualized by partitioning the data into portions such as slices, which can then be rendered as two-dimensional images. The radiologist may then e.g., scroll through the images to assess the volume.

Because different slices correspond to different parts of the imaging volume, different slices may represent different features of the patient, such as different anatomical features of the patient. In a given series, there may be many slices, and there may be multiple series for a radiologist to assess. It can be time consuming for a radiologist to navigate through the images, for example to images in which the feature or features of interest are shown. A radiologist may not be able to spare such time, for example in emergency cases.

SUMMARY

According to one aspect, there is provided a computer implemented method of annotating a portion of medical imaging data with one or more words corresponding to a respective one or more features represented in the portion of medical imaging data, the method comprising: obtaining one or more first portions of first medical imaging data; for each of the one or more first portions and for each of a plurality of second portions of reference medical imaging data, determining a similarity metric indicating a degree of similarity between the second portion and the first portion, wherein each of the plurality of second portions is annotated with one or more first words corresponding to a respective one or more features represented in the second portion; for each of the one or more first portions, selecting a second portion from among the plurality of second portions based on the similarity metrics determined for the first portion and the second portions; and for each of the one or more first portions, annotating the first portion with the one or more first words with which the second portion, selected for the first portion, is annotated.

DETAILED DESCRIPTION

Figure 1:
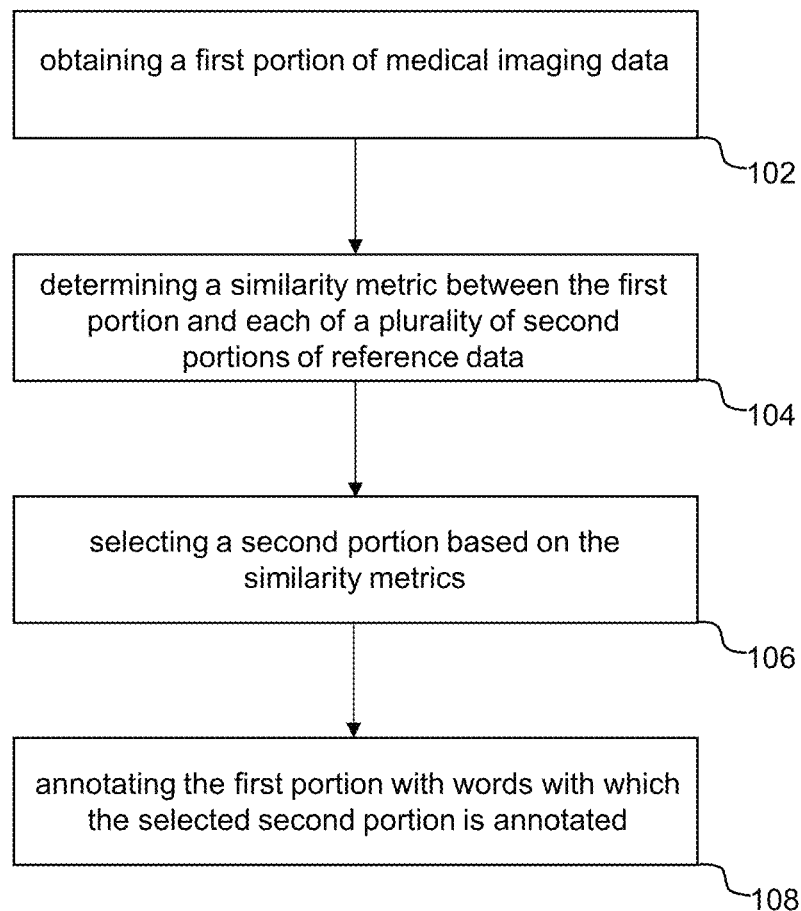
FIG. 1 is a flow diagram illustrating schematically a method according to an example.

Referring to FIG. 1, there is illustrated a computer implemented method of annotating a portion of medical imaging data with one or more words corresponding to a respective one or more features represented in the portion of medical imaging data.

Figure 2:
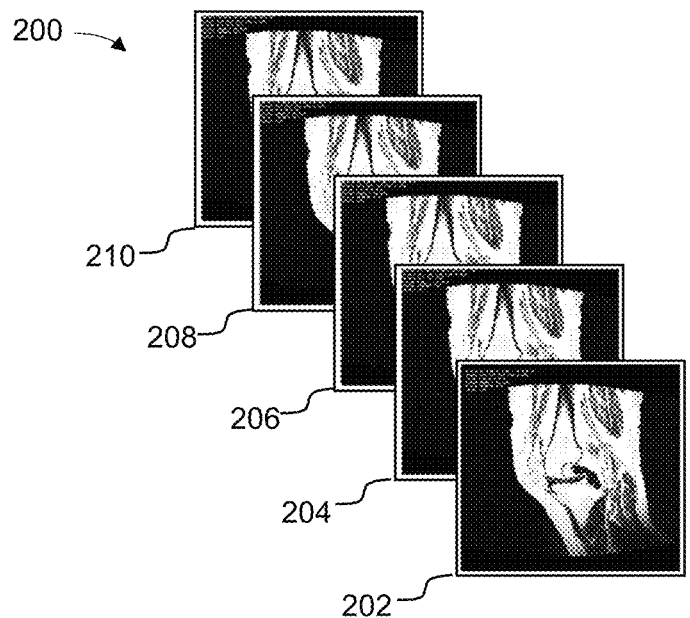
FIG. 2 is a schematic diagram illustrating first portions of first medical imaging data, according to an example.
Figure 3:
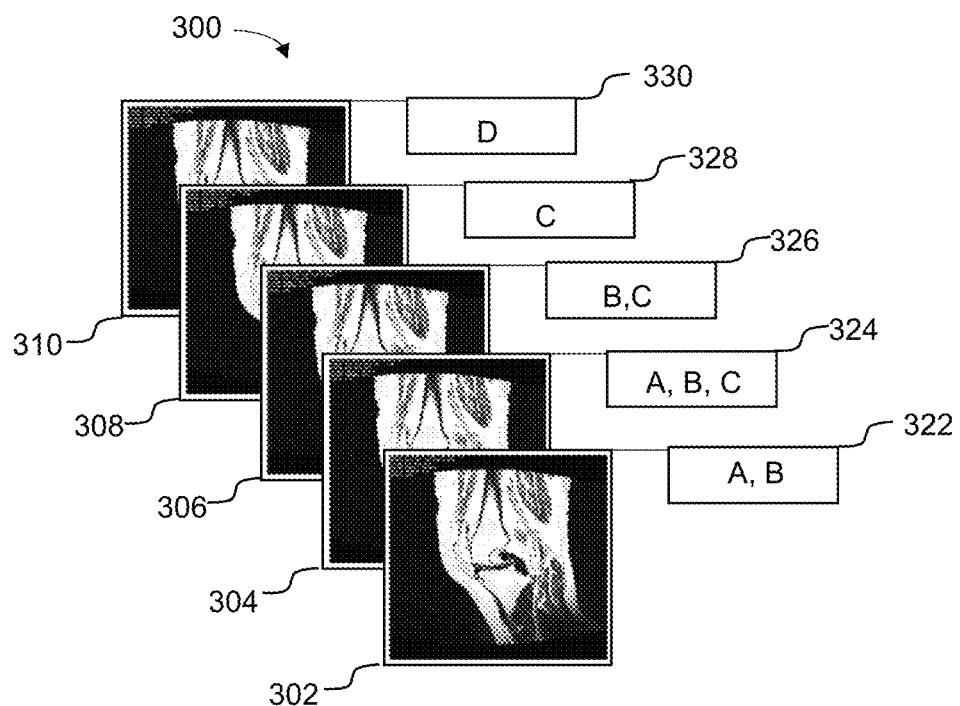
FIG. 3 is a schematic diagram illustrating second portions of reference medical imaging data according to an example.
Figure 4:
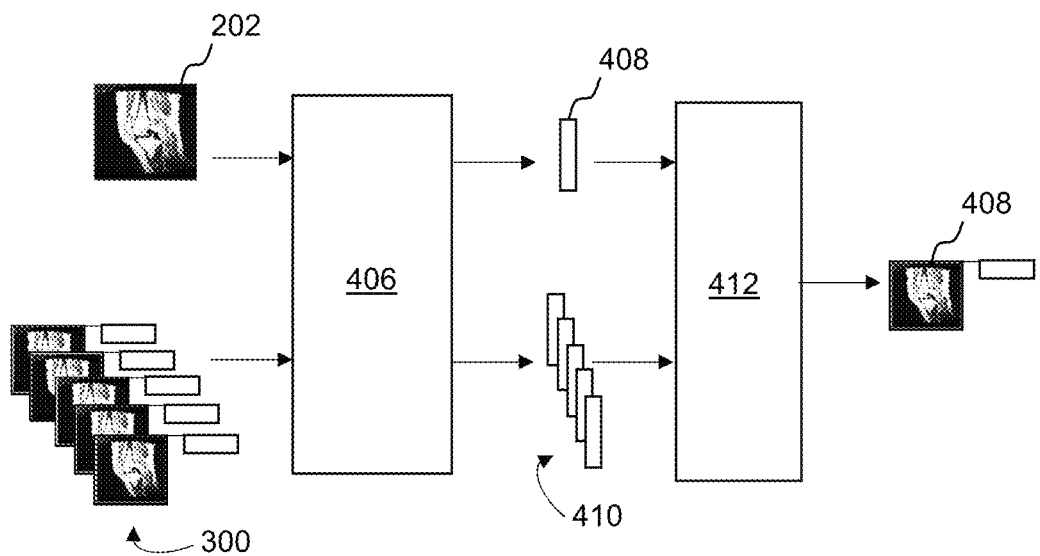
FIG. 4 is a schematic diagram illustrating functional blocks of a neural network, according to an example.

In broad overview, the method comprises:
in step 102, obtaining one or more first portions of first medical imaging data (see e.g., first portions 202-210 of first medical imaging data 200 in FIG. 2);
in step 104, for each of the one or more first portions 202-210 and for each of a plurality of second portions of reference medical imaging data (see e.g. second portions 302-310 of reference medical imaging data 300 in FIG. 3), determining a similarity metric indicating a degree of similarity between the second portion 302-310 and the first portion 202-210, wherein each of the plurality of second portions 302-310 is annotated 322-330 with one or more first words A-D corresponding to a respective one or more features represented in the second portion 302-310;
in step 106, for each of the one or more first portions 202-210, selecting a second portion 302-310 from among the plurality of second portions 302-310 based on the similarity metrics determined for the first portion 202-210 and the second portions 302-310; and
in step 108, for each of the one or more first portions 202-210, annotating the first portion 202-210 with the one or more first words A-D with which the second portion 302-310, selected for the first portion 202-210, is annotated (see e.g., the resulting annotated first portion 408 in FIG. 4).

Accordingly, each of one or more first portions 202-210 of medical imaging data 200 may be annotated with one or more words A-D corresponding to a respective one or more features represented in the first portion of medical imaging data. For example, a text file associated with the first portion 202-210 may be generated or modified to include the one or more words A-D.

Annotating the first portion 202-210 with words A-D with which a second portion 302-310 of reference medical imaging data, selected for the first portion 202-210 based on a similarity between the first portion 202-210 and the second portion 302-310, is annotated, may allow for flexible and/or efficient annotation of the first portion 202-210. For example, this may be as compared to applying Landmark Detection to the first portion 202-210 to determine anatomical landmarks represented by the first portion. Landmark Detection techniques apply trained classifiers to identify different anatomical landmarks in images, which requires a different classifier to be trained and applied for each different landmark that is to be detected, which is computationally expensive and, in some cases, not possible and/or depends on the imaging modality with which the image was acquired. However, according to the method of FIG. 1, the second portions 302-310 of the reference medical imaging data need only have been annotated with words corresponding to the features represented. The words with which the first portion 202-210 is annotated is then based on the similarity of the first portion 202-210 with the second portions 302-310, which can be done independently of the imaging modality used to acquire the first portion and without needing to apply trained classifiers to detect features in the first portion. Flexible and/or efficient annotation may therefore be provided.

The resulting annotated first portion 202-210 has utility and may be used in many different ways. Some example ways in which the resulting annotated first portion may be used are described below with reference to FIGS. 5 to 7. As one example, the one or more words A-D with which each first portion 202-210 is annotated may be searched, e.g., by a suitably executed query, for a particular feature of interest (e.g., a particular anatomical feature), and one or more first portions annotated with one or more words A-D matching the query may be extracted and e.g., displayed to a radiologist. This may significantly reduce the burden associated with a radiologist navigating through all of the plurality of first portions 202-210 to identify those in which the particular feature of interest is represented. Moreover, by extracting and displaying one or more first portions annotated with one or more words A-D matching the query, the computational and/or communications burden associated with extracting and displaying all of the plurality of first portions 202-210 for the radiologist to assess, may be reduced.

As mentioned, the method comprises, in step 102, obtaining one or more first portions 202-210 of first medical imaging data 200. The first medical imaging data 200 is also referred to herein as patient medical imaging data 200.

The patient medical imaging data 200 may comprise an array of elements each having a value. For example, the patient medical imaging data may comprise a three-dimensional array of voxels, each voxel having at least one value. The at least one value may correspond to or otherwise be representative of an output signal of the medical imaging technique used to generate the first medical imaging data. For example, for Magnetic Resonance Imaging, the value of an element (e.g., voxel) may correspond to or represent a rate at which excited nuclei, in a region corresponding to the element, return to an equilibrium state. In some examples, each element may only have one value. However, in other examples, each element may have or otherwise be associated with multiple values. For example, the multiple values of a given element may represent the values of respective multiple signal channels. For example, each signal channel may represent a different medical imaging signal or property of the imaging subject. In some examples, the at least one value may comprise an element (e.g., voxel) intensity value. For example, an output signal from the medical imaging may be mapped onto a voxel intensity value, for example a value within a defined range of intensity values. For example, for a greyscale image, the intensity value may correspond to a value in the range 0 to 255, where 0 represents a 'black' pixel and 255 represents a 'white' pixel, for example. As another example, for example as in the case of USHORT medical image data, the intensity value may correspond to a value in the range 0 to 65536. As another example, in a color image (e.g., where different colors represent different properties of the imaging subject) each pixel/voxel may have three intensity values, e.g., one each for red, green, and blue channels. It will be appreciated that other values may be used.

Referring to FIG. 2, there is illustrated an example of patient medical imaging data 200 (i.e., first medical imaging data 200). In this example, the patient medical imaging data 200 is volumetric data, i.e., the data covers a three-dimensional region or volume of the patient. In this example therefore, the patient medical imaging data 200 comprises a three-dimensional array of voxels, each voxel having at least one value. The patient medical imaging data 200 comprises a plurality of first portions 202, 204, 206, 208, 210. Each of the first portions 202-210 corresponds to a respective slice of the patient medical imaging data 200. As illustrated, the slices 202-210 are slices through an imaging volume containing a knee of a patient. As illustrated, the slices 202-210 are in a sequence and each successive slice in the sequence corresponds to medical imaging data at a successive axial position. For example, if each slice 202-210 extended in [an] a plane defined by two perpendicular axes (e.g., x, y axes) each successive slice in the sequence would correspond to a successive position along an axis orthogonal to the two axes (e.g., z axis). In some examples, each slice 202-210 may be two-dimensional in the sense that each slice has a thickness of one voxel. In some examples, each slice may be pseudo two-dimensional in that each slice has a thickness of a few voxels, or in any case significantly less than the thickness of the patient medical imaging data 200 overall. In either case, each slice of data can be rendered into a two-dimensional image, as shown.

As mentioned, the method comprises, in step 104, determining a similarity metric indicating a degree of similarity between the first portion 202-210 and each of a plurality of second portions 302-310 of reference medical imaging data 300.

Similar to the patient medical imaging data 200, the reference medical imaging data 300 comprises an array of elements each having a value. For example, the reference medical imaging data may comprise a three-dimensional array of voxels, each voxel having at least one value, similarly to as described above.

Referring to FIG. 3, there is illustrated an example of reference medical imaging data 300. The reference medical imaging data 200 comprises a plurality of second portions 302, 304, 306, 308, 310. Similar to the first portions 202-210 of patient medical imaging data, each of the second portions 302-310 of reference medical imaging data 300 may correspond to a respective slice 302-310 of the reference medical imaging data 300, similarly to as described above. As illustrated in FIG. 3, the slices 302-310 are slices through an imaging volume containing a knee of a patient (or human who need not necessarily be a patient). The patient of the reference medical imaging data 300 (i.e., the 'reference patient') need not necessarily be the same patient as the patient of the patient medical imaging data 200, and in practice will not be the same patient as the patient of the patient medical imaging data 200. However, the features (e.g., the anatomical features of a knee) of the reference patient and another patient will generally correspond because anatomy amongst human beings is generally shared. In some examples (as illustrated), there may be only one set of reference medical imaging data 300. For example, it may be predefined that the method is to be used for patient medical imaging data 200 including generally the same anatomical region (e.g., a knee region) as the second medical imaging data 300 generally depicts. In other examples, there may be multiple sets of reference medical imaging data (not shown), for example each set being for a different anatomical region of a patient. In these examples, the method may comprise selecting the set of reference medical imaging data to be used. This selection may comprise, for example, a user selecting the appropriate anatomical region (and hence appropriate reference medical imaging data 300 to be used), or the appropriate anatomical region being determined automatically from an analysis of the patient medical imaging data 200 (e.g., from information in image headers or from the image data itself). As illustrated, the slices 302-310 are in a sequence and the sequence extends in the same direction, relative to the patient, as the direction in which the sequence of first portions 102-210 extends. For example, the direction, relative to the patient, in which the sequence extends may be standardized, for example standardized for each anatomical region. As another example, the direction in which the patient medical imaging data 200 is sliced may be chosen to match that of the reference medical imaging data 300.

In any case, each of the plurality of second portions 302-310 of reference medical imaging data 300 is annotated 322-330 with one or more first words A-D corresponding to a respective one or more features represented in the second portion 302-310. For example, each second portion 302-310 of reference medical imaging data may be stored in association with text data 322-330 that consists of or comprises the one or more first words A-D corresponding to a respective one or more features represented in the second portion 302-310. For example, each second portion 302-310 may be associated with (e.g., stored in association with) a text file 322-330 including the one or more words A-D corresponding to a respective one or more features represented in the second portion 302-310.

For each of the second portions 302-310, the associated annotation 322-330 lists first words A-D corresponding to a respective one or more features represented in the second portion 302-310. For example, for a given second portion 302-310, the first words A-D may each be the names of anatomical features that are visibly present in the second portion 302-310. As illustrated in the example of FIG. 3, a first slice (second portion) 302 includes a representation of anatomical features A and B, and hence the first words corresponding to the name of the anatomical features A and B are included in the associated annotation 322. For example, the first slice 302 may show the anatomical features of the posterior cruciate ligament (pcl) and the anterior cruciate ligament (acl) of the knee. Accordingly, the words A, B included in the annotation 322 for the first slice may be the words 'posterior cruciate ligament' or 'pcl' and 'anterior cruciate ligament' or 'acl'. It is noted that, as used herein, 'word' may mean a single word or a combination of words, e.g., together constituting a name for a given feature, e.g., an anatomical feature. Similarly, the slice 304 shows features A, B, and C, and hence it is annotated 324 with words A, B, C. Similarly, the slice 306 is annotated 326 with words B, C; the slice 308 is annotated 328 with the word C; and the slice 330 is annotated with the word D. The annotations 322-330 may be made by a medical expert examining each of the second portions 302-308, and typing in the names of the features (e.g., anatomical features) present or illustrated in the second portion 302-310. Other methods may in principle be used to generate the annotations, for example by applying feature detection to each of the second portions 302-310.

The reference medical imaging data 300 acts as a reference against which first portions 202-210 of patient medical imaging data 200 may be compared. The reference medical imaging data may be thought of as a standardized 'atlas' for features, such as anatomical features of the human body or a portion thereof. The reference medical imaging data 300 may be re-used for many such comparisons. In other words, the annotations 322-330 contained in the reference medical imaging data 300 need only be generated or determined once, but then can be used as a reference in the annotation of many sets of patient medical imaging data 200, e.g., for many different patients.

Referring to a particular patient medical imaging data 200, as mentioned, the method comprises, for each of the first portions 202-210, determining a similarity metric indicating a degree of similarity between the first portion 202-210 and each of the plurality of second portions 302-310 of reference medical imaging data 300.

In some examples, determining the similarity metric may for a given first portion 202 and a given second portion 302 may be based on a measure of similarity between a first feature vector representing the first portion 202 and a second feature vector representing the second portion 302. For example, the similarity metric may comprise the cosine similarity or Euclidian distance, or other similarity measure, of the first feature vector and the second feature vector. In some examples, the feature vectors may be determined using a neural network trained, based on an input portion of medical imaging data, to generate a feature vector representative of the input portion of medical imaging data. For example, the neural network may be a convolutional neural network trained to determine a feature vector (e.g., a column vector) whose values are representative of the input portion of medical imaging data in feature space. For example, determining the similarity metric may comprise determining a measure of similarity between a first feature vector generated by inputting the first portion 202 into the trained neural network and a second feature vector generated by inputting the second portion 302 into the trained neural network. The neural network may be a deep neural network.

In some examples, the second feature vectors for each of the plurality of second portions 302-310 may be determined in advance (e.g., by inputting the second portions 302-310 into the trained neural network) and stored in association with the respective second portions 302-310 in the reference medical imaging data 300. In these examples, the reference medical imaging data 300 need not necessarily include the imaging data itself, rather, for example, only the second feature vectors for each second portion 302-310 and the annotations 322-330 associated with each. In these examples, determining the similarity metric may comprise determining the measure of similarity between the first feature vector determined for the given first portion 302 and each of the pre-calculated second feature vectors for each of the respective second portions 302-310.

In some examples, the first feature vector and the second feature vector may be obtained by first inputting the first portion 202 into the trained neural network to obtain the first feature vector and then inputting the second portion 302 into the trained neural network to obtain the second feature vector.

In some examples, the trained neural network may be part of a Siamese neural network trained to output a similarity metric indicating a degree of similarity between two input portions of medical imaging data. For example, the Siamese network may comprise two 'twin' convolutional neural networks having shared (i.e., the same) weights. The first portion 202 may be input into a first of these convolutional neural networks to generate the first feature vector and the second portion 302 input into the second of these convolution neural networks to generate the second feature vector. A similarity measure (e.g., Euclidean distance, cosine similarity, or the like) may be determined between the first and second vectors, and this may be passed through an activation function (e.g., sigmoid function or the like) to produce a similarity metric indicating the degree of similarity between the first portion 202 and the second portion 302. For example, the similarity metric may be between 0 and 1, where 0 indicates completely dissimilar and 1 indicates identical. In these examples, the Siamese neural network may be trained based on a training data set comprising pairs of images known to be similar and pairs of images known to be dissimilar. The similar pairs may be labelled with a similarity metric of 1, and the dissimilar pairs may be labelled with a similarity metric of 0. The Siamese neural network may then be trained, based on the training data set, and using the label of each pair as a supervisory signal. Other neural networks may be used.

As mentioned, the method comprises, in step 106, for each of the one or more first portions 202-210, selecting a second portion 302-310 from among the plurality of second portions 302-310 based on the similarity metrics determined for the first portion 202-210 and the second portions 302-310.

In some examples, selecting the second portion 302-310 may comprise, for a given first portion 202, selecting that second portion 302-310 among the plurality which has the largest similarity metric with the first portion 202. This may be repeated for each of the first portions 202-210.

In some examples, where there is a plurality of the first portions 202-210, selecting a second portion 302-310 for each of the plurality of first portions 202-210 may comprise generating a one-to-one mapping between the plurality of first portions 202-210 and the plurality of second portions 302-310 that maximizes a total of the determined similarity metrics. In other words, there may be enforced a condition that any given second portion 302-310 may only be mapped onto or paired with at most one of the first portions 202-210, and within this constraint the pairings may be optimized so as to maximize the sum of the similarity metrics resulting from the pairings. This may allow for more accurate selection of the second portion 302-310 for a given first portion 202. For example, this may particularly effective in cases where the slice resolution (i.e., the physical distance between the regions that consecutive slices represent) or the number of slices in the reference medical imaging data 300 is the same or similar to that of the patient medical imaging data 200.

In any case, a second portion 302-310 is selected for each of the one or more first portions 202-210. As mentioned, the method comprises, in step 108, for each of the one or more first portions 202-210, annotating the first portion 202-210 with the one or more first words A-D with which the second portion 302-310, selected for the first portion 202-210, is annotated. For example, referring to FIGS. 2 and 3, if the second portion 302 was selected for the first portion 202 (e.g., based on the second portion 302 having the highest similarity metric with the first portion 202 out of all of the second portions 302-310), then the words A and B included in the annotation 322 of the second portion 302 will be used to annotate the first portion 202.

In some examples, annotating a given first portion 202-210 may comprise storing text data that comprises or consists of the one or more first words A-D, with which the selected second portion 302-310 is annotated, in association the given first portion. For example, a text file associated with the given first portion 202-210 may be generated or modified to include the one or more first words A-D of the selected second portion 302-310.

As a result, each first portion 302-310 is annotated with words that correspond to features represented in the first portion 302-310. For example, the second portion 302 may be selected for the first portion 202 because it is a high similarity metric. It may therefore be inferred that the features represented in the second portion 302 are the same as those represented in the first portion 202. Accordingly, by annotating the first portion 202 with the same words A, B with which the second portion 302 of the reference medical imaging data was annotated, the first portion 202 is now annotated with words A, B that correspond to the features represented by the first portion 202. This may be applied for all of the first portions 202-210 of the patient medical imaging data 200.

In some examples, the position of a first portion 202 within the patient medical imaging data 200, and the position of each of the second portions 302 within the reference medical imaging data 300, may be used to inform the selection of the second portion 302 for the first portion 202. For example, as mentioned above, each first portion 202-210 may be a slice of the patient medical imaging data 200 and each second portion 302-310 may be a slice of the reference medical imaging data 300. In some examples, each first portion 202-210 may be associated with a first slice position value indicative of a position, within the patient medical imaging data 200, of the respective slice to which the first portion 202-120 corresponds; and each second portion 302-310 may be associated with a second slice position value indicative of a position, within the reference medical imaging data 300, of the respective slice to which the second portion corresponds 302-310. For example, the first slice position value may be an index of the position of the slice within the sequence of slices. For example, referring to FIG. 2, the first slice position value of slices 202, 204, 206, 208, and 210 may be 1, 2, 3, 4, and 5, respectively. Similarly, referring to FIG. 3, the second slice position value of slices 302, 304, 306, 308, and 310 may be 1, 2, 3, 4, and 5, respectively. In such examples, the method may comprise, for each of the one or more first portions 202-210 and for each of the plurality of second portions 302-310, determining a slice position similarity metric indicative of a similarity between the first slice position value associated with the first portion 202 with the second slice position value associated with the second portion 302. For example, the slice position similarity metric may be based a difference between the first slice position value and the second slice position value. For example, for first slice 202 and second slice 302, in the example mentioned above, the difference would be 0, indicating a high slice position similarity, whereas for first slice 202 and second slice 310, the difference would be 4, indicating a low slice position similarity. In such examples, for each of the one or more first portions 202-210, selecting the second portion 302 from among the plurality of second portions 302-310 may be further based on the slice position similarity metrics determined for the first portion 202 and the second portions 302-310. For example, an overall similarity metric may comprise a combination of, e.g., a weighted combination of, the similarity metric and the slice position similarity metric, and the second portion 202-210 may be selected for a given first portion 202 based on the overall similarity metric. This helps encode the relative spatial positioning of the slices into the selection of the second portion 302. This may help improve the accuracy of the selection as compared to using similarity between the image data (e.g., feature vectors thereof) alone.

Referring to FIG. 4, there is illustrated schematically a flow according to which the method may be implemented, according to an example. The illustrated flow is for a given first portion 202 of patient medical imaging data 200. The first portion 202 is input into a feature vector generator 406 (e.g., a trained neural network as described above) which accordingly outputs a first feature vector 408 for the first portion 202. The plurality of second portions of reference medical imaging data 300 are also input into the vector generator 406 to generate a set of second feature vectors 410, one for each of the plurality of second portions. As described above, the second feature vectors 410 may be determined in advance of or concurrently with the first feature vector 408, and the feature vector generator 406 may comprise, for example a convolutional neural network and/ or may be part of a Siamese neural network.

The first feature vector 408 and the second feature vectors 410 are input into a comparator 412, which determines a similarity metric between the first vector and each of the plurality of second vectors 410, selects a second portion based on the similarity metrics, and annotates the first portion 202 with the words with which the selected second portion is annotated (for example as described above). In some examples, the selection may also be based on a slice position similarity metric, as described above. In any case, the comparator 408 outputs the annotated first portion 408. This may be repeated for each of the first portions 202-210. Each of the first portions may therefore be annotated with words A, B that correspond to the features represented by the first portion 202.

As mentioned above, the method described above with reference to FIGS. 1 to 4 provides for flexible and/or efficient annotation of first portions of patient medical imaging data, for example as compared to using Landmark Detection to identify the features represented by each of the first portions. Moreover, having the patient medical imaging data 200 with first portions 202-210 annotated with words A-D corresponding to the features represented thereby, has many uses. For example, the words are searchable by executing a suitable query. Accordingly, first portions 202- 210 that represent or include certain features (e.g., certain anatomical features) may be identified by such a word search, e.g., without requiring a radiologist to visually inspect all of the first portions 202-210 and/or without having to extract and render all of the first portions 202-210 for inspection.

Other example ways in which the annotated first portions of patient medical imaging data may be used will now be described with reference to FIGS. 5 to 7.

Firstly, there is described a motivating scenario. In certain cases, it is useful or necessary for a radiologist to look back at a previous medical text report and its associated medical image slices. For example, the radiologist may wish to compare the previous medical image slices to a current medical image slice for which a medical text report is to be generated, in order to assess the progression of a disease of a particular anatomical feature. However, in order to do this, the radiologist must open and look through each of the previous medical image slices to identify the slice or slices which show the particular anatomical feature of interest. Conversely, the radiologist must read through all of the previous medical text report in order to identify the findings relevant to an anatomy shown in a particular previous image. This is time consuming and burdensome. Moreover, it requires all of the previous medical image slices to be extracted, communicated to a radiologist terminal, and displayed, which is resource intensive.

Accordingly, in some examples, the method according to the present disclosure may comprise obtaining one or more first sections F1-F3 of text of a medical text report 504 associated with the patient medical imaging data 200, each first section F1-F3 comprising one or more second words; and for each of the one or more first sections F1-F3 and for each of the one or more first portions 102-110: comparing one or more of the second words of the first section F1-F3 with one or more of the first words A-D with which the first portion 202 is annotated to identify a match; and associating the first portion 202-210 with the first section F1-F3 on the basis of the identified match. This allows for each section F1-F3 of the medical text report to be linked to a particular one or more first slices 202-210 of the patient medical imaging data, according to the features represented in the particular one or more first slices 202-210 being mentioned in that section F1-F3. As described in more detail below, this link can be used e.g., to allow a radiologist to easily identify particular first slices 202-210 that correlate with a particular sections F1-F3 of the medical text report, and vice versa. This may in turn e.g., reduce or eliminate the burden associated with the radiologist finding a particular first slice 202-210 of interest and/or reduce or eliminate the resource burden associated with needing to extract, communicate and display all of the first slices 202-210.

As mentioned, the method may comprise obtaining one or more first sections F1-F3 of text of a medical text report 504 associated with the patient medical imaging data 200, each first section F1-F3 comprising one or more second words. FIG. 5 illustrates schematically such a medical text report 504. In this example the medical text report 504 is a radiology report and the first sections F1-F3 are three findings. In this example each finding F1-F3 is a sentence of second words. Specifically, finding F1 is the text "grade I mucoid degradation of anterior horn of lateral meniscus", finding F2 is the text "ad mucoid degeneration", and finding F3 is the text "intact pcl, with no abnormal signal". The findings may be entered into the report 504 as separate findings, or the medical text report 504 may be pre-processed to segment the text into sections/sentences/findings F1-F3. A given one of these first sections F1-F3 may be obtained. The medical text report 504 may be the report generated based on a radiologist reading the patient medical imaging data 200.

As mentioned, the method may then comprise, for each first portion 202-210 and for each first section F1-F3, comparing one or more of the second words of the first section F1-F3 with the first words A-D with which the first portion 202 is annotated to identify a match. For example, the first portion 202 may show an anterior cruciate ligament (acl) and hence may be annotated with the first words "anterior cruciate ligament" and/or "ad" (as a result of the process described above with reference to FIGS. 1 to 4). These words may be compared to the words of the first section F2 i.e., to the words "ad mucoid degeneration". Based on this comparison there may be a match identified (e.g., a match of the word "ad"), i.e., in that the same word appears in both the first section F2 and the annotation of the first image 202. As a result of this match, the first portion 202 may be associated with the first section F2. For example, the first portion 202 (or a reference thereto) may be stored in association with the first section F2 (or a reference thereto) in a storage, for example in a table in a storage. Accordingly, a link is established between the finding F2 and the first portion 202 which shows an anatomical feature to which the finding F2 relates. This may be repeated for each of the first sections F1-F3. Accordingly, for each first section F1-F3 of the medical text report, there may be identified the first portion or portions 202-210 that show the anatomical feature relevant to that first section F1-F3.

In some examples, the method may comprise receiving data indicating a selection of one of the first sections F1-F3 of text; and generating display data for causing a rendering 502 of a said first portion 202 associated with the selected first section F1-F3 to be displayed on a display device (not shown).

In some examples, the selection of the first section F1-F3 may be a user selection. For example, the pane 504 shown in FIG. 5 may be an element of a GUI, in which the GUI allows the radiologist to select (e.g., by hovering a curser over or clicking on) a particular one of the first sections F1-F3. In the illustrated example, the first section F2 has been selected. Accordingly, the first portion 202 that has been associated with this first section F2 is determined (e.g., by reference to the table). The first portion 202 may then be extracted from a storage, and a rendering 502 of the first portion 202 may be displayed on a display device to the radiologist. Accordingly, the radiologist can immediately see the first portion 202 that shows the feature of interest (e.g., the acl), and hence the burden and resource usage can be reduced, e.g., as compared to extracting and looking through all of the first portions 202-210 to find the first portion that shows the feature of interest.

In some examples, there may be a plurality of first portions 202-210 associated with the selected first section F2. For example, more than one of the first portions 202-210 may show the acl, and hence more than one of the first portions 202-210 may be annotated with the word "acl". In these cases, a first section F2 may match to more than one of the first portions 202-210. In these cases, the display data may be generated for causing a rendering 502 of a representative one 204 of the plurality of first portions 202-210 to be displayed on the display device (not shown). For example, the representative first portion 204 may be chosen from among the plurality of first portions 202-210 that are associated with the selected first section F2 based on the representative first portion 204 being centrally located among those plurality of first portions 202-210. For example, if there are three first slices 202, 204, 206 associated with the selected first section F2, then the representative slice among these may be chosen as first slice 204, as it is centrally located or positioned with the sequence of first portions 202, 204, 206. This may help maximize the chance that the representative first portion 204 shows a major or central portion of the feature of interest, which may be the most helpful of the first portions for assessing the feature of interest.

In some examples, the method may comprise, responsive to receiving data indicating the selection of one of the first sections of text F1-F3, retrieving, from a remote storage (see e.g., 806 in FIG. 8) via a network (see e.g., 804 in FIG. 8), a said first portion 202 associated with the selected first section F2 (e.g., the representative first portion for the first section F2), without retrieving other ones of the first portions 202-210 constituting the patient medical imaging data 200. Only retrieving the first section(s) 202-210 determined as associated with the selected first section F1-F2 may allow to reduce the network resource usage, e.g., as compared to retrieving all of the first sections 202-210.

In some examples, the method may comprise receiving data indicating a selection of one of the first portions 202-210 of patient medical imaging data 200; and generating display data for causing a said first section F2 associated with the selected first portion 202 to be displayed or highlighted on a display device.

For example, as shown in FIG. 4, for a given selected first portion 202, the associated first section F2 (or sections as the case may be) may be highlighted in bold on the GUI pane 504. This may allow for a radiologist, given a particular first portion 202 of interest, quickly to identify the sections F1-F3 of the medical text report 504 that relate to the anatomical features that are shown in that particular first portion 202. This may reduce the burden associated with the radiologist having to read through all of the medical text report to identify findings relevant to a particular first portion 202.

In some examples, the GUI may be configured such that the radiologist can scroll (backwards or forwards) through renderings 502 of different first portions 210-210 in sequence. In these examples, the selection of one of the first portions 202-210 may comprise selecting the first portion 202-210 whose rendering 502 is currently displayed. In this way, as the radiologist scrolls through the renderings of the first portions 202-210, the corresponding first sections F1-F3 may be highlighted accordingly in turn.

Figure 5:
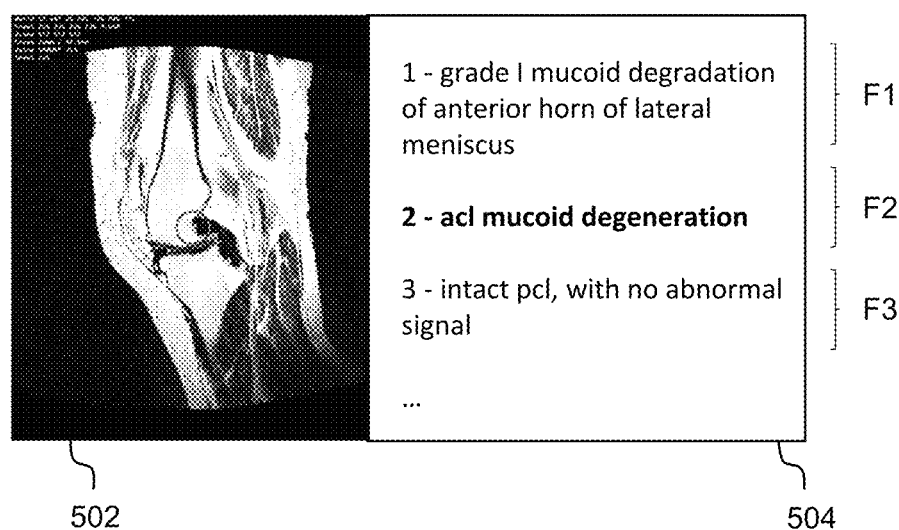
FIG. 5 is a schematic diagram illustrating a rendering of display data according to an example.
Figure 6:
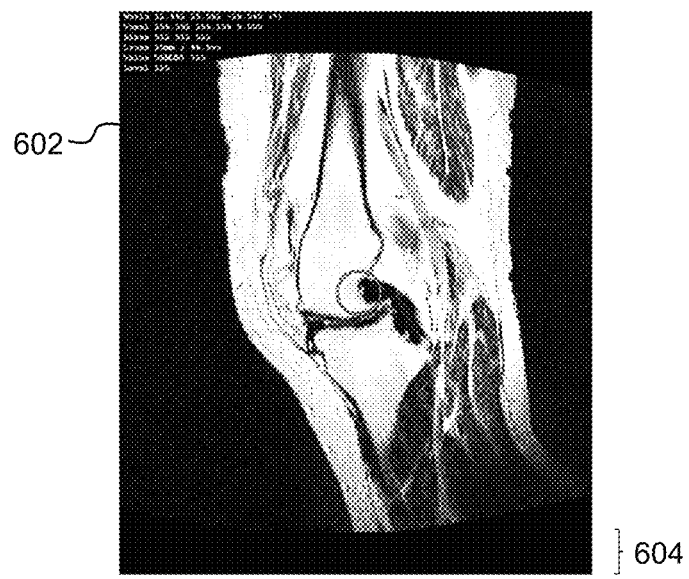
FIG. 6 is a schematic diagram illustrating a rendering of display data according to another example.

In the example of FIG. 5, the text 504 is displayed on a separate portion of the GUI to the rendering 502. However, alternatively or additionally, in some examples, the generated display data may be for causing a said first section F1-F3 associated with the selected first portion 202-210 to be displayed as overlaid on a rendering of the selected first portion 202-210. For example, referring to FIG. 7, there is illustrated a rendering 602 of a selected first portion 202, overlaid on which is text of the first section F2 associated with the selected first portion 202. Specifically, in this example, the text "ad mucoid degeneration" is overlaid onto the rendering 602 of the first portion 202 that shows the acl. This may help make readily apparent to the radiologist the first section or sections F1-F2 that are associated with the selected first portion 202.

In some examples, the associations between the first portions 202-210 of the medical imaging data 200 and the first sections F1-F3 of the medical text report 504 may be used to generate a new, second medical text report based on new, further medical imaging data. For example, a radiologist may be reading new, further medical imaging data for the same region of the same patient as for which the patient medical imaging data 200 was obtained. The new, further medical text report may be generated based on the first medical text report 504, but, for example, updated to account for developments of the previous findings and/or new findings, as assessed by the radiologist reading the new medical imaging data.

For example, the method may comprise generating display data for causing a given first section F1-F3 and a rendering of a said first portion 202 associated with the given first section F1-F3 to be displayed on a display device. For example, the data displayed may be similar to that illustrated in FIG. 5. A given first section F1-F3 may be displayed on its own or highlighted (as is first section F2 in FIG. 5) to indicate that the given first section is selected. Further, in some examples, the display data may additionally or alternatively be for causing a GUI element 702 to be displayed on the display device, the GUI element 702 allowing a user to accept, reject, or modify the given first section F1-F3 for use in generating a second medical text report (not shown) associated with further medical imaging data (not shown). The method may comprise receiving user input via the GUI 702 indicating whether to accept, reject, or modify the given first section F1-F3 for use in generating the second medical text report. Responsive to the user input indicating to reject, the given first section F1-F3 is not included in the second medical text report. Responsive to the user input indicating to accept, the given first section F1-F3 may be copied into the second medical text report. Responsive to the user input indicating to modify, a modified version of the given first section may be obtained (e.g., from a text-editing window of the GUI element (not shown)) and the modified version of the given first section F1-F3 may be included into the second medical text report.

Figure 7:
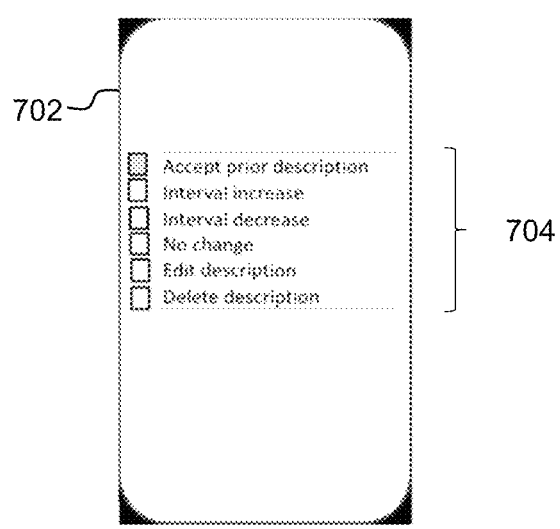
FIG. 7 is a schematic diagram illustrating an element of a Graphical User Interface (GUI) according to an example.

An example GUI element 702 is illustrated in FIG. 7. As illustrated, in this example the GUI element 702 comprises a number of check boxes 704 that are selectable by the radiologist for a given first section F1-F3 of the first medical text report 504. The checkboxes 704 include "Accept prior description". If this is selected, then the given first section F1-F3 will be copied, unmodified, into the second medical text report. The checkboxes 704 also include "Interval increase", "Interval decrease", and "No change". If one of these are selected, then the given first section F1-F3 will be modified to insert the words "Interval increase in:", "Interval decrease in:", or "No change in:" respectively, in front of the given first section F1-F3, before being included in the second medical text report. The checkboxes 704 also include "Edit description". If this is selected, then a text editing window (not shown) may be opened to allow the radiologist to edit the given first section F1-F3, and the edited version of the first section may be included in the second medical text report. The checkboxes 704 also include "Delete description". If this is selected, then the given first section is not copied to the second medical text report, and the process may move on to the next first section F1-F3 to be considered.

Each of the first sections F1-F3 of the first medical text report 504 may be selected in turn. The radiologist may make the selection of whether to accept, reject or modify each first section in turn. In this way, the new, second medical text report may be generated based on the first medical text report 504. As mentioned above, in some examples, when the given first section F1-F3 is selected, a rendering 502 of the first portion 202-210 associated with the given first section F1-F3 is displayed. Therefore, the radiologist can compare the relevant first portion 202-210 to new, further medical imaging data (not shown), to assess whether the selected first section F1-F3 of the medical text report 504 should be accepted, rejected, or modified for use in the new, second medical text report for the further medical imaging data. This reduces both the burden of the radiologist in finding the relevant first portion 202-210 with which to compare the further medical imaging data, and also the burden of generating the new, second medical text report. Further, since only the relevant first portions 202-210 need be extracted and rendered, the resource usage associated with extracting, communicating, and rendering all of the first portions 202-210 may be reduced.

Figure 8:
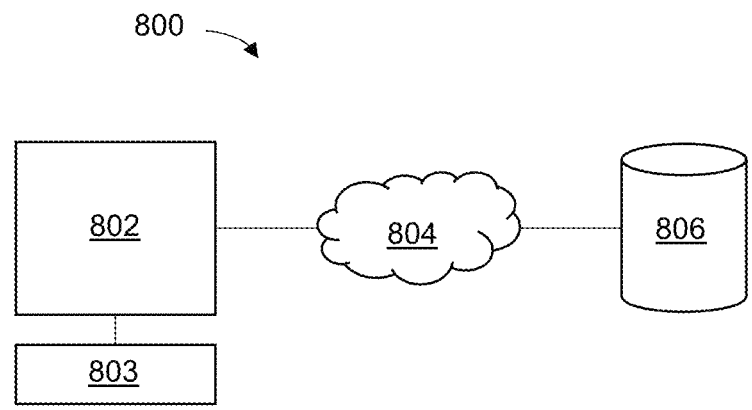
FIG. 8 is a schematic diagram illustrating a system according to an example.

Referring to FIG. 8, there is illustrated an example system 800 in which the method may be implemented in some examples. The system 800 comprises a computer 802, a display device 803, a network 804 and a storage 806. The computer 802 may be configured to perform the method according to any one of the examples described above with reference to FIGS. 1 to 7. The display device 803 may be used to display the renderings 502, 602 and/or the GUI elements 504, 704 according to any one of the examples described above with reference to FIGS. 1 to 7. The computer 802 is configured to communicate with the storage 806 over the network 804. For example, the network 804 may comprise a Local Area Network or a Wide Area Network, such as the Internet. In this example, the storage 806 represents an archive and is configured to store medical imaging data and associated medical text reports. For example, the storage 806 may store the patient medical imaging data 200 and the associated first medical text report 504. The storage 806 is remote from the computer 802 in the sense that it is accessible via the network 804 rather than locally at the computer 802. In such implementation environments, it can be important to reduce or limit the volume of data that is transmitted over the network 804, for example due to limited bandwidth resources. Medical imaging data can be particularly large in terms of size, so it can be useful to reduce the transmission of medical imaging data over the network 804, where possible. In existing systems, the medical imaging data associated with a medical text report may be extracted as a whole from the storage 806 and transmitted to the computer 802, which can be resource intensive. However, according to examples of the present disclosure, as mentioned above the computer 802 may determine and/or store an association between first sections F1-F3 of a medical text report 504 and the respective relevant first portions 202-210 of the medical imaging data 200. The computer 802 may be configured to, responsive to receiving data indicating a selection of one of the first sections F1-F3, retrieve from the remote storage 806 via the network 804, the first portion 202-210 associated with the selected first section F1-F3, without retrieving other ones of the first portions 202-210 constituting the patient medical imaging data 200. In other words, in some examples, only that first portion 202-210 relevant to the first section F1-F3 that has been selected is retrieved from the remote storage 806. Accordingly, the overall volume of data that is transmitted over the network 804 may be reduced.

Figure 9:
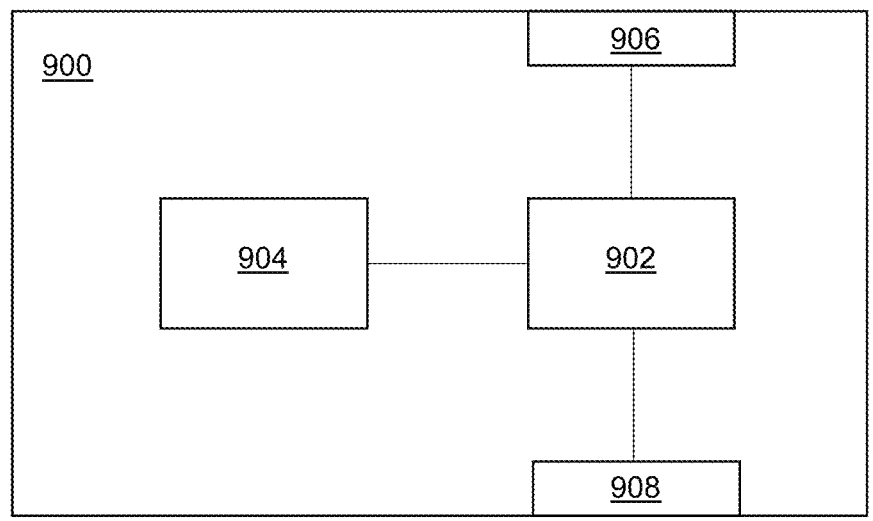
FIG. 9 is a schematic diagram illustrating an apparatus according to an example.

Referring to FIG. 9, there is illustrated an apparatus 900 according to an example. The apparatus may be a computer 900. The apparatus 900 may be used in place of the computer 802 described above with reference to FIG. 8. The apparatus 900 may be configured to perform the method according to any of the examples described above with reference to FIGS. 1 to 7. The apparatus 900 may be configured for communication with a remote storage 806 over a network 804, for example according to any of the examples described above with reference to FIGS. 1 to 8.

As illustrated, the apparatus 900 comprises a processor 902, a memory 904, an input interface 906 and an output interface 908. The memory 904 may include one or more a non-transitory computer readable media that store instructions which when executed by the processor 902, cause the apparatus 900 to perform the method according to any one of the examples described above with reference to FIGS. 1 to 8. The instructions may be provided on one or more non-transitory computer readable media. The instructions may be in the form of a computer readable program code. The input interface 906 may, for example, be configured to receive the user inputs and/or selections according to any of the examples described above with reference to FIGS. 1 to 8. For example, the input interface 906 may be connected to an input means such as a keyboard and/or mouse (not shown), via which the user/radiologist may provide input and/or selections. For example, the selection of a given first section F1-F3 of a medical text report 504 may be provided by a using the mouse to click on first section F1-F3 to be selected. The processor 902 may be configured to receive the inputs and/or selections via the input interface 906. The output interface 908 may be configured to output the display data according to any one of the examples described above with reference to FIGS. 1 to 9. For example, the output interface 908 may be connected to a display device, such as the display device 803 of FIG. 8, and output display data to the display device. For example, the display device may be caused, via the output display data, to display the renderings 502, 602 and/or the GUI elements 504, 704 according to any one of the examples described above with reference to FIGS. 1 to 8. The processor 902 may be configured to output the display data via the output interface 908.

The above examples are to be understood as illustrative examples. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer implemented method of annotating a portion of medical imaging data with one or more words corresponding to a respective one or more features represented in the portion of medical imaging data, the method comprising:
    obtaining one or more first portions of first medical imaging data;
    for each of the one or more first portions of the first medical imaging data and for each of a plurality of second portions of reference medical imaging data, determining a similarity metric and a slice position similarity metric, wherein the similarity metric indicates a degree of similarity between the second portion and the first portion, wherein the slice position similarity metric indicates a similarity between a first slice position value associated with the first portion and a second slice position value associated with the second portion, wherein each of the plurality of second portions is annotated with one or more first words corresponding to a respective one or more features represented in the second portion;
    for each of the one or more first portions of the first medical imaging data, selecting a second portion from among the plurality of second portions annotated with the one or more first words based on the slice position similarity metrics and by generating a one-to-one mapping between the first portions and the second portions that maximizes a sum of the similarity metrics, wherein each of the second portions is mapped onto at most one of the first portions; and
    for each of the one or more first portions of the first medical imaging data, annotating the first portion with the one or more first words with which the second portion, selected for the first portion, is annotated.

2. The computer implemented method according to claim 1 further comprising:
    obtaining one or more first sections of text of a medical text report associated with the first medical imaging data, wherein at least one of the one or more first sections comprises one or more second words; and
    for each of the one or more first sections and for each of the one or more first portions of the first medical imaging data, comparing one or more of the second words of the first section with one or more of the first words with which the first portion is annotated to identify a match, and associating the first portion with the first section based on the match.

3. The computer implemented method according to claim 2 further comprising:
    receiving data indicating a selection of one of the first sections of text; and
    generating display data for causing a rendering of a said first portion associated with the selected one of the first sections of text to be displayed on a display device.

4. The computer implemented method according to claim 3, wherein, where there is a plurality of first portions associated with the selected one of the first sections of text, the display data is generated for causing a rendering of a representative one of the plurality of first portions to be displayed on the display device.

5. The computer implemented method according to claim 4, wherein the representative one of the plurality of first portions is chosen from among the plurality of first portions based on the representative one of the plurality of first portions showing a central portion of a feature of interest.

6. The computer implemented method according to claim 2 further comprising:
    responsive to receiving data indicating a selection of one of the first sections of text, retrieving, from a remote storage via a network, a first portion associated with the selected one of the first sections of text, without retrieving other ones of the first portions constituting the first medical imaging data.

7. The computer implemented method according to claim 1 further comprising:
    receiving data indicating a selection of one of the one or more first portions of the first medical imaging data; and
    generating display data for causing a first section associated with the selected one of the one or more first portions to be displayed or highlighted on a display device.

8. The computer implemented method according to claim 7, wherein the generated display data is for causing a first section associated with the selected one of the one or more first portions of the first medical imaging data to be displayed as overlaid on a rendering of the selected one of the one or more first portions of the first medical imaging data.

9. The computer implemented method according to claim 2 further comprising:
    generating display data for causing a given first section, a rendering of a said first portion associated with the given first section, and a graphical user interface (GUI) element to be displayed on a display device, the GUI element allowing a user to accept, reject, or modify the given first section for use in generating a second medical text report associated with further medical imaging data;
    receiving user input via the GUI indicating whether to accept, reject, or modify the given first section for use in generating the second medical text report;

responsive to the user input indicating to reject, not including the given first section in the second medical text report;

responsive to the user input indicating to accept, copying the given first section into the second medical text report; and responsive to the user input indicating to modify, obtaining a modified version of the given first section and including the modified version of the given first section into the second medical text report.

10. The computer implemented method according to claim 1, wherein for each of the one or more first portions of the first medical imaging data and for each of the plurality of second portions, determining the similarity metric comprises:

determining a measure of similarity between a first feature vector generated by inputting the first portion into a trained neural network and a second feature vector generated by inputting the second portion into the trained neural network, the trained neural network having been trained to, based on an input portion of medical imaging data, generate a feature vector representative of the input portion of medical imaging data.

11. The computer implemented method according to claim 10, wherein the trained neural network comprises a Siamese neural network.

12. The computer implemented method according to claim 1, wherein the first and second slice position values comprise index values indicative of positions along an axial axis.

13. The computer implemented method according to claim 1, wherein the slice position similarity metric is based on a difference between the first slice position value and the second slice position value.

14. An apparatus, comprising:
a non-transitory memory for storing computer readable program code; and
a processor in communication with the non-transitory memory, the processor being operative with the computer readable program code to perform a method for annotating a portion of medical imaging data with one or more words corresponding to a respective one or more features represented in the portion of medical imaging data, the method comprising:
obtaining one or more first portions of first medical imaging data;
for each of the one or more first portions of the first medical imaging data and for each of a plurality of second portions of reference medical imaging data, determining a similarity metric and a slice position similarity metric, wherein the similarity metric indicates a degree of similarity between the second portion and the first portion, wherein the slice position similarity metric indicates a similarity between a first slice position value associated with the first portion and a second slice position value associated with the second portion, wherein each of the plurality of second portions is annotated with one or more first words corresponding to a respective one or more features represented in the second portion;
for each of the one or more first portions of the first medical imaging data, selecting a second portion from among the plurality of second portions annotated with the one or more first words based on the slice position similarity metrics and by generating a one-to-one mapping between the first portions and the second portions that maximizes a sum of the similarity metrics, wherein each of the second portions is mapped onto at most one of the first portions; and
for each of the one or more first portions of the first medical imaging data, annotating the first portion with the one or more first words with which the second portion, selected for the first portion, is annotated.

15. The apparatus of claim 14 wherein the processor is operative with the computer readable program code to
obtain one or more first sections of text of a medical text report associated with the first medical imaging data, wherein at least one of the one or more first sections comprises one or more second words; and
for each of the one or more first sections and for each of the one or more first portions of the first medical imaging data, compare one or more of the second words of the first section with one or more of the first words with which the first portion is annotated to identify a match, and associate the first portion with the first section based on the match.

16. The apparatus of claim 15 wherein the processor is operative with the computer readable program code to
receive data indicating a selection of one of the first sections of text; and
generate display data for causing a rendering of a said first portion associated with the selected one of the first sections of text to be displayed on a display device.

17. The apparatus of claim 16 wherein, where there is a plurality of first portions associated with the selected one of the first sections of text, the display data is generated for causing a rendering of a representative one of the plurality of first portions to be displayed on the display device.

18. The apparatus of claim 17 wherein the representative one of the plurality of first portions is chosen from among the plurality of first portions based on the representative one of the plurality of first portions showing a central portion of a feature of interest.

19. The apparatus of claim 15 wherein the processor is operative with the computer readable program code to
responsive to receiving data indicating a selection of one of the first sections of text, retrieve, from a remote storage via a network, a first portion associated with the selected one of the first sections of text, without retrieving other ones of the first portions constituting the first medical imaging data.

20. One or more non-transitory computer-readable media embodying instructions executable by machine to perform operations for annotating a portion of medical imaging data with one or more words corresponding to a respective one or more features represented in the portion of medical imaging data, the operations comprising:
obtaining one or more first portions of first medical imaging data;
for each of the one or more first portions of the first medical imaging data and for each of a plurality of second portions of reference medical imaging data, determining a similarity metric and a slice position similarity metric, wherein the similarity metric indicates a degree of similarity between the second portion and the first portion, wherein the slice position similarity metric indicates a similarity between a first slice position value associated with the first portion and a second slice position value associated with the second portion, wherein each of the plurality of second portions is annotated with one or more first words corresponding to a respective one or more features represented in the second portion;

for each of the one or more first portions of the first medical imaging data, selecting a second portion from among the plurality of second portions annotated with the one or more first words based on the slice position similarity metrics and by generating a one-to-one mapping between the first portions and the second portions that maximizes a sum of the similarity metrics, wherein each of the second portions is mapped onto at most one of the first portions; and for each of the one or more first portions of the first medical imaging data, annotating the first portion with the one or more first words with which the second portion, selected for the first portion, is annotated.

\* \* \* \* \*